(12) United States Patent
Scott et al.

(10) Patent No.: US 6,305,756 B1
(45) Date of Patent: Oct. 23, 2001

(54) SHORT TRAVEL DETECTOR FOR EMPTY/LOAD BRAKE CONTROL

(75) Inventors: Daniel G. Scott, Pittsburgh; Mark S. Krampitz, Hunker, both of PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/635,038

(22) Filed: Aug. 4, 2000

(51) Int. Cl.[7] ........................................ B60T 8/18
(52) U.S. Cl. ................... 303/22.2; 188/195; 303/22.7
(58) Field of Search ....................... 303/22.2, 22.3, 303/22.8, 22.7, 22.6; 188/195; 73/146

(56) References Cited

U.S. PATENT DOCUMENTS

| | | | |
|---|---|---|---|
| 3,608,680 | * 9/1971 | Beacon | 188/195 |
| 3,612,621 | * 10/1971 | Scott | 303/22.2 |
| 3,671,086 | * 6/1972 | Scott. | |
| 3,716,119 | * 2/1973 | Ludington et al. | 303/22.2 |
| 3,794,146 | * 2/1974 | Ludington et al. | 188/195 |
| 4,583,790 | * 4/1986 | Scott. | |
| 6,079,795 | * 6/2000 | Engle | 303/22.2 |

* cited by examiner

*Primary Examiner*—Douglas C. Butler
(74) *Attorney, Agent, or Firm*—James Ray & Associates

(57) ABSTRACT

An empty/load brake control system mountable on a sprung and an unsprung member of a railway car and disposed between the car brake control valve and brake cylinder for adjusting the brake cylinder pressure during a brake application according to the car load condition. Such system includes an empty/load sensor valve device and a sensor arm coupled to a sensor cable whose movement is controlled by a sprung member and a terminal member disposed on an end of sensor cable, in contact with sprung member so that any downward movement of sprung member forces such terminal member in a similar downward direction and similarly pulls on the sensor cable. A piston, under pressure, urges the sensor arm to rotate and retract sensor cable but must overcome resistance of a spring. The system includes a load proportional valve.

7 Claims, 3 Drawing Sheets

SHORT TRAVEL DETECTOR FOR EMPTY/LOAD BRAKE CONTROL

FIELD OF THE INVENTION

The present invention relates, in general, to an empty/load type brake control system for a railway freight car and, more particularly, this invention relates to a short travel detector for an empty/load sensor valve device disposed in such empty/load type brake control system.

BACKGROUND OF THE INVENTION

On today's high capacity railroad cars that are used in freight type service, good braking under both empty and loaded weight conditions is a must in order to move goods quickly and smoothly and to satisfy the shippers' demand for "on time" performance.

Single capacity brake equipment produces a brake shoe force that is independent of car loading, thus making it difficult to achieve desirably higher braking ratios for a loaded car without exceeding an empty car braking ratio that would be sufficient to cause the wheel to slide. Sliding wheels are undesirable because of reduced braking retardation.

Special brake equipment is, therefore, necessary to increase the loaded car braking ratio without incurring the consequences of a wheel slide condition when braking an empty car. Such equipment automatically adjusts brake shoe force according to the load conditions of the car. The special equipment falls into two primary categories, dual capacity empty/load braking and multiple capacity or continuously variable braking.

In the dual capacity empty/load equipment, there are just two settings, one for "empty" braking and one for "load" braking. The changeover point between the "empty" and "load" settings in this arrangement is selected at some predetermined car weight. This car weight is usually at 20% of the full load capacity weight. In arbitrarily selecting this changeover point, it will be appreciated that a given car can be generally under-braked by the reduced brake pressure when the car weight is in the upper end of the "empty" weight range, since essentially the same adhesion demand is available at the lower end of the "load" weight range at which the maximum braking force is capable of being supported without sliding the car wheels.

In the variable load type equipment, braking pressure is proportioned according to the actual load, generally throughout the full range of car loading. It will be appreciated, however, that the proportioned brake pressure is selected in accordance with the maximum brake pressure (emergency) capable of being developed from the maximum running pressure normally carried by a train (110 psi). Therefore, when making relatively light service brake applications, or when making a maximum brake application from a relatively low running pressure (70 psi), the proportioned brake pressure may be far less than that capable of being supported by the adhesion demand. Accordingly, less than an optimum brake efficiency will be realized under certain brake conditions with variable load type brake equipment, as well as single capacity equipment, in order to protect against detrimental wheel sliding on an empty car under maximum braking conditions.

In known dual capacity brake systems, such as disclosed in U.S. Pat. No. 3,671,086, this problem is overcome by a proportioning valve arrangement that reduces the braking pressure by a fixed ratio during empty car braking. In order to be compatible with the quick service limiting valve requirements for freight brake control valves, which assures that 8 to 12 psi brake cylinder pressure will be developed from even the lightest service application, the aforementioned system withholds the empty/load sensing function until a predetermined minimum brake cylinder pressure has developed, generally 12 psi.

However, since as equalizing volume is required in such proportioning type dual capacity systems to maintain proper control valve operation, an inadvertent loss of braking pressure can occur when the empty/load changeover valve sensing function comes into play, due to existing brake cylinder pressure being able to momentarily backflow into the equalizing volume. This occurs when a light service reduction is made, just sufficient to operate the load sensing valve on empty cars, the brake cylinder pressure can build up to 12 psi. and then be reduced back to the limiting valve pressure setting on each car, which can be as light as 8 psi. This problem is overcome by the empty/load valve device disclosed in U.S. Pat. No. 5,005,915.

Only two compact air valves and a small volume reservoir are needed to convert single capacity freight car brake equipment to a simplified empty and load operation. A load sensor valve is used to measure the relationship of the car body to the top of the truck side frame to determine if the car is empty or loaded and a load proportional valve which controls the air flow to the brake cylinder when an empty car condition exists. Generally the brake pressure for an empty car is 50 or 60% of that applied for a full car for each amount of brake pipe reduction. The small volume reservoir provides the necessary volume to maintain satisfactory pressure relationships for various brake pipe reductions on the empty car.

An entirely different type of problem is encountered in the use of empty/load braking devices in some railroad cars. In particular, a problem arises in some cars manufactured in foreign countries where there is insufficient displacement between an empty and a load condition for the sensor arm of the standard empty/load sensor valve to travel its full displacement. Thus, since the distance for sensor arm travel is restricted it makes the standard empty/load equipment inoperable.

SUMMARY OF THE INVENTION

As can be seen in the above description, there is a need in such cases to modify an empty/load sensor valve to accommodate the lack of proper displacement. The present invention provides an empty/load brake control system mountable on a sprung and an unsprung member of a railway car and operably disposed between the railway car brake control valve and brake cylinder devices for adjusting the brake cylinder pressure during a brake application according to the railway car load condition. Such empty/load brake control system comprises an empty/load sensor valve device with an inlet passage connected to a brake control valve device and an outlet passage connected to a brake cylinder device. Such empty/load sensor valve further contains a load sensing means engagable with such sprung and unsprung members for measuring the distance therebetween to provide an empty setting and a load setting depending upon such distance being greater or less than a predetermined distance corresponding to a changeover point between the empty and load settings. Such load sensing means includes a sensor arm, coupled to a sensor cable whose downward movement is controlled by the sprung member and movable from a retracted position toward disengagement with the railway car unsprung member and a terminal member disposed on an end of the sensor cable and positioned in contact with such sprung member so that any downward movement of such sprung member forces the terminal member in a similar downward direction and similarly pulls on such sensor cable. Such load sensing means also has a sensor piston connected to such sensor arm and which is subject to fluid under pressure effective at the inlet passage during a brake application. The sensor piston urges movement of the sensor arm to rotate and retract the sensor cable from such extended position toward engagement with the railway car sprung and unsprung members and a sensor spring which resists movement of said sensor piston by a predetermined preload. Such empty/load sensor brake control system further includes a load proportional valve means disposed between the empty/load sensor valve device and the brake control valve, having a proportioning mode of operation and a non-proportioning mode of operation, including a valve seat between such inlet and outlet passages, a balance piston having equal opposing pressure areas, one of the pressure areas being subject to fluid under pressure effective at the inlet passage and a release check valve connected to said balance piston and which controls said valve seat. The empty/load brake control system further utilizes an equalizing volume reservoir disposed between the load proportional valve means and empty/load sensor valve device for providing a necessary volume to maintain a satisfactory relationship for various pipe brake reductions. Finally, in such empty/load brake control system such sensor piston of such empty/load sensor valve means is fluidly connected to the balance piston of the load proportional valve for supplying fluid under pressure which is effective, at such equalizing volume inlet port to the other of such pressure areas of such balance piston when such empty/load sensor valve device is in an empty setting, to establish a differential force across such balance piston in a direction of engagement of such check valve with such valve seat, thereby providing a proportioning mode of operation; and not supplying fluid under pressure to the other such pressure area of such balance piston when such empty/load sensor valve device is in a load setting thereby providing a non-proportioning mode of operation.

OBJECTS OF THE INVENTION

It is, therefore, one of the primary objects of the present invention to provide a short travel detector for an empty/load sensor valve device for use in railway vehicles where there is insufficient displacement for full sensor arm travel which will improve braking efficiency.

An additional object of the present invention is to provide a short travel detector for an empty/load sensor valve device in which there is insufficient displacement for full sensor arm travel wherein it is possible to use a smaller sensor cable.

A further object of the present invention is to provide a short travel detector for an empty/load sensor valve device in which there is insufficient displacement for full sensor arm travel wherein the terminal member of the cable will not be impeded by a buildup of snow or mud in the gap between such terminal member and a sprung truck member.

Yet another object of the present invention to provide a short travel detector for an empty/load sensor valve device for use in railway vehicles where there is insufficient displacement for full sensor arm travel that is relatively maintenance free.

Still another object of the present invention to provide a short travel detector for an empty/load sensor valve device for use in railway vehicles where there is insufficient displacement for full sensor arm travel that will reduce incidence of wheel sliding thereby reducing stopping distances.

It is another object of the present invention to provide a short travel detector for an empty/load sensor valve device for use in railway vehicles where there is insufficient displacement for full sensor arm travel to reduce maintenance costs on repair and replacement of wheels and rails by having reduced incidence of wheel sliding.

In addition to the several objects and advantages of the present invention which has been described in detail above, various other objects and advantages of the invention will become much more readily apparent to those persons skilled in railway vehicle braking systems and, more particularly, empty/load sensor valves from the following more detailed description of such invention particularly when such description is taken in conjunction with the attached drawing Figures and with the appended claims.

Figure 1:
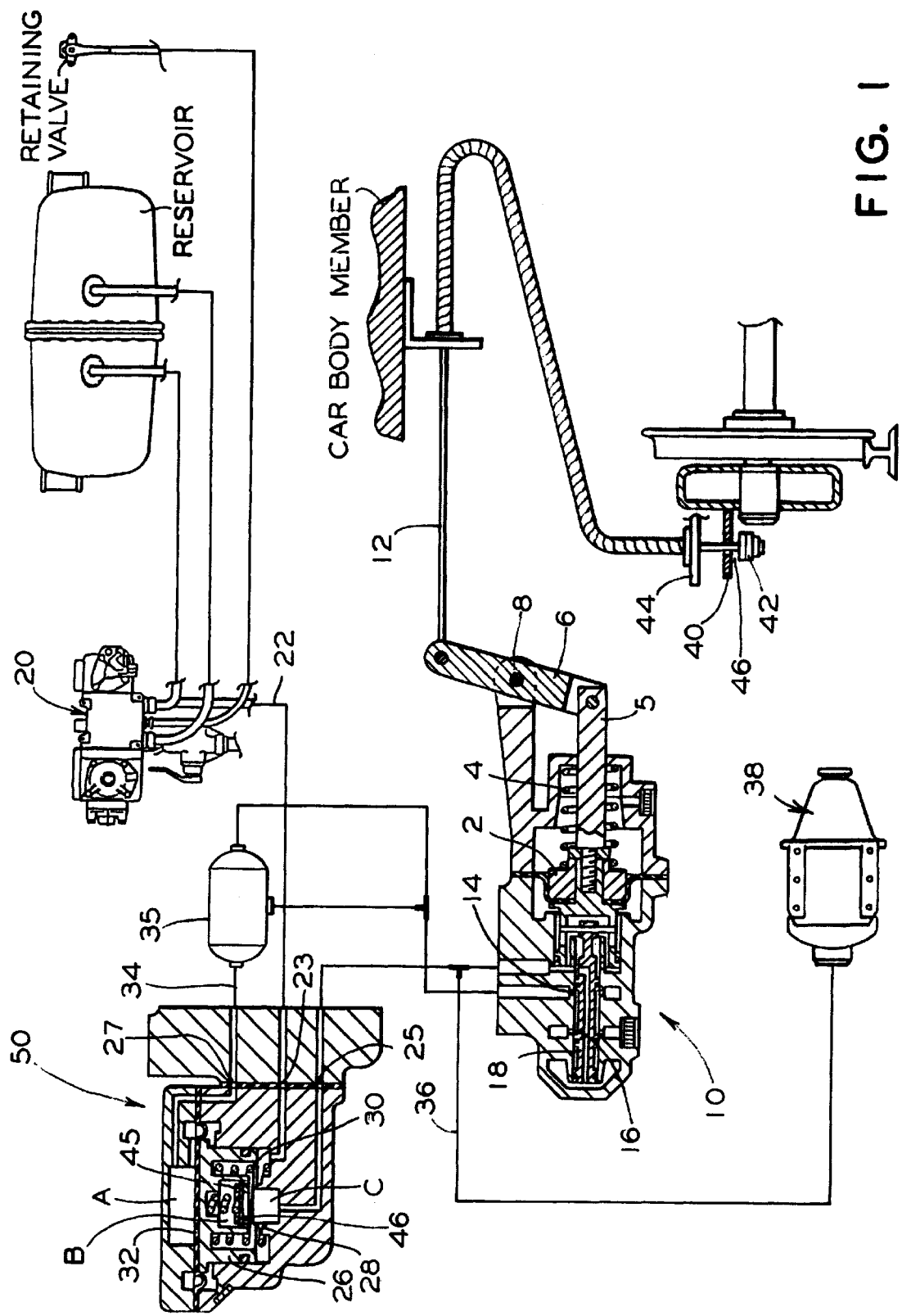
FIG. 1 is a schematic diagram, partially in cross-section, of an empty/load brake control system showing a presently preferred embodiment of the empty/load sensor valve device of the present invention.

BRIEF DESCRIPTION OF THE PRESENTLY PREFERRED AND VARIOUS ALTERNATE EMBODIMENTS OF THE INVENTION

Prior to proceeding to the more detailed description of the present invention, it should be noted that for the sake of clarity in understanding the invention, identical components with identical functions have been designated with identical reference numerals throughout the drawing Figures.

Figure 2:
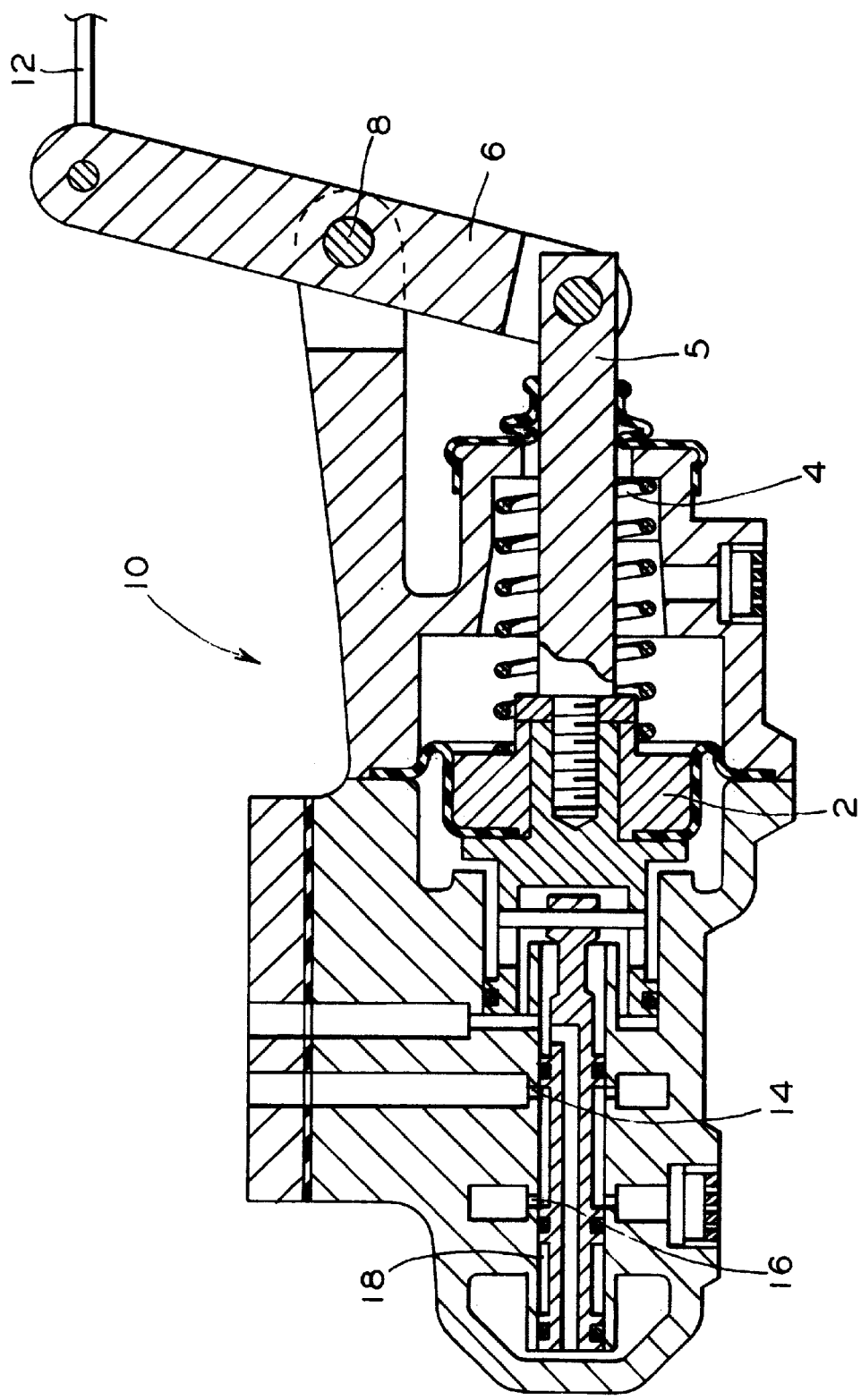
FIG. 2 is an enlarged view, partially in cross-section, of the presently preferred embodiment of the empty/load sensor valve device employed in the empty/load brake control system illustrated in FIG. 1.

Reference is now made, more particularly, to FIG. 2. Illustrated therein is a partial cross-sectional view of an empty/load sensor valve device, generally designated 10, showing a presently preferred embodiment of the instant invention. Empty/load sensor valve device 10 includes a sensor valve piston member 2 for exerting a force on push rod 5 which in turn acts on sensor arm 6.

When there is no pressure on empty/load sensor valve device 10, sensor valve piston 2 is held in position by the sensor valve spring 4 and does not exert any force on such push rod 5. In this position such push rod 5 does not act on sensor arm 6. Sensor arm 6 does not rotate around pivot 8 and there is no pull on sensor cable 12. Also passages 14 and 16 are in position to be vented by spool valve 18.

Figure 3:
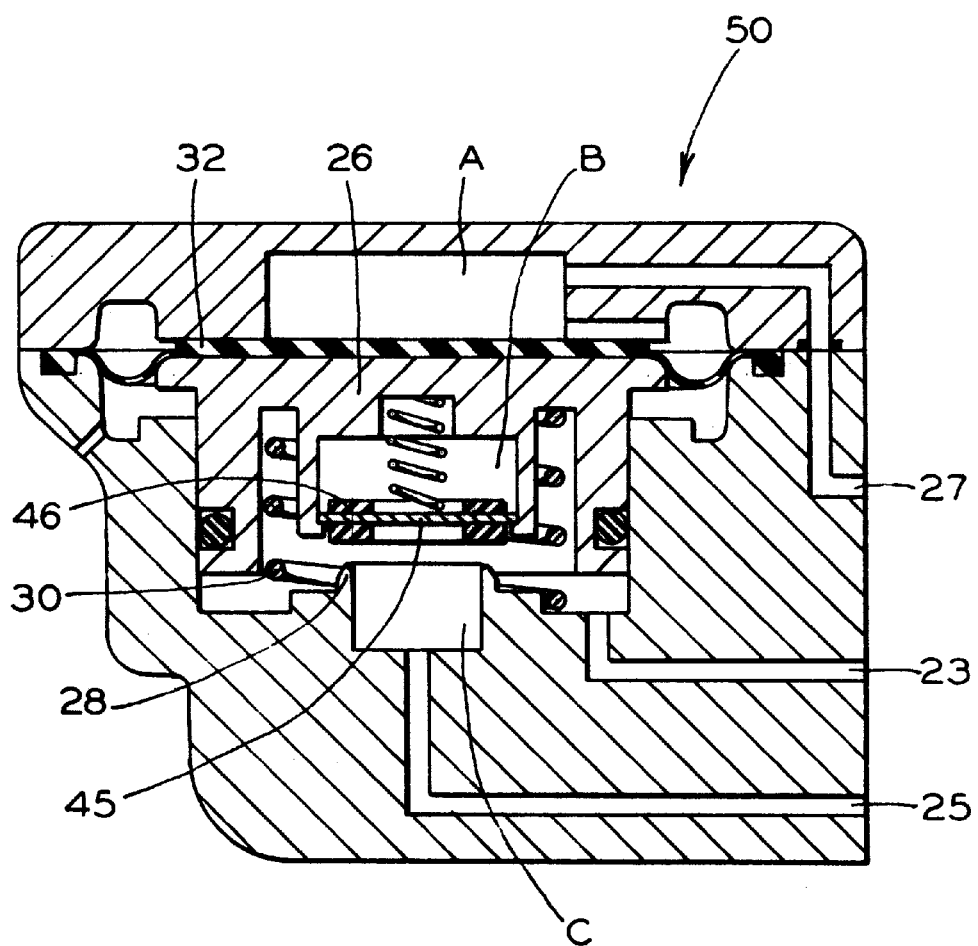
FIG. 3 is a cross-sectional view of a load proportional valve employed it he brake system illustrated in FIG. 1.

Referring now to FIG. 3 of the drawings, load proportional valve, generally designated 50, is shown in detail. This load proportional valve 50 is essentially the same as the "P-1 Load Proportioning Valve" manufactured by Westinghouse Air Brake Company for the industry standard SC-1 Empty and Load Freight Brake Equipment and also disclosed in U.S. Pat. No. 3,671,086 incorporated herein by reference.

Briefly, load proportional valve 50 comprises a differential area balance piston 26 that is subject on one side to the pressure effective at equalizing volume port 27, and thus at cavity A above diaphragm 32, and on the opposite side to the pressure effective at inlet port 23. Balance piston 26 carries a check valve 45 with a valve element 46 that is cooperatively arranged to engage and disengage an annular valve seat 28 in accordance with the position of balance piston 26. A return spring 30 acts on balance piston 26 to bias balance piston 26 in its uppermost position in which valve element 46 is unseated.

Reference is now made, more particularly, to FIG. 1. Illustrated therein is a schematic diagram of an empty/load brake control system showing a presently preferred embodiment of the empty/load sensor valve device 10 of the present invention.

When there is no pressure entering load proportional valve 50 at port 23 from brake cylinder line 22 from freight brake control valve 20, force exerted by piston spring 30 will hold diaphragm 32 and balance piston 26 in its upmost position. Cavity A and the passages above diaphragm 32 are connected to atmosphere through equalizing volume port 27. Air is vented to atmosphere through air line 34, equalizing volume reservoir 35, passages 14 and 16 of empty/load sensor valve 10 and through internal passages of empty/load sensor valve 10 to exhaust.

As mentioned previously, with no pressure on the system, sensor valve piston 2 is held in position by sensor valve spring 4, and no force is exerted on push rod 5 or sensor arm 6.

In the following description of the operation of empty/load sensor valve 10 and load proportional valve 50 during brake applications it should be understood that when empty/load sensor valve 10 indicates a "loaded" car that load proportional valve 50 has no effect on brake cylinder air pressure, thereby directing essentially 100% of the air pressure from freight brake control valve 20 to brake cylinder 38 for a given amount of brake pipe reduction.

When, on the other hand, empty/load sensor valve 10 indicates an "empty car" condition, load proportional valve 50 responds by closing off the flow of air under pressure from freight brake control valve 20 to brake cylinder 38 until the air pressure in brake cylinder 38 reaches approximately 50 to 60% of the air pressure directed from freight brake control valve 20 for a given amount of brake pipe reduction.

During a brake application, brake cylinder air in brake cylinder line 22, under pressure, enters inlet port 23 of load proportional valve 50. Air passes through the internal passages of load proportional valve 50 into cavity B above the valve element 46 of check valve 45 and through exit port 25 to such air line 36 to brake cylinder 38. Equalizing volume air from equalizing volume reservoir 35 directed to port 27 of load proportional valve 50 is directed through the internal passages and into cavity A above diaphragm 32. When the equalizing volume pressure in cavity A builds up to a value to overcome the force exerted on balance piston 26 by piston spring 30, diaphragm 32 and balance piston 26 will move downward to close off the flow of air between port 23 and port 25 of load proportional valve 50.

Brake cylinder air not only flows to brake cylinder 38 from air line 36 but it also flows to the left side of sensor valve piston 2 of empty/load sensor valve 10. Sensor valve piston 2 must exert a pressure of at least 13–15 psi before the sensor valve piston 2 can urge push rod 5 to move causing sensor arm 6 to rotate. A pressure of 13–15 psi is required in order to overcome the preload of the sensor valve spring 4. This insures maximum available brake cylinder pressure during a minimum reduction.

For a reduction larger than minimum, pressure on sensor valve piston 2 will overcome the resistance of sensor valve spring 4 and urge push rod 5 to move sensor arm 6 which will rotate on sensor arm pivot 8 and try to pull sensor cable 12.

If the railroad car is loaded, or if the truck spring deflection is greater than 20%, sensor cable 12 will be pulled by the sprung truck member (bolster) 40 which has moved away from the unsprung truck member 44 by the weight of the load on the car. Unsprung truck member 44 cannot move since it is connected to such truck side frame. Cable terminal member 42 cannot move past sprung truck member 40, which is displaced because of the car's loaded condition, which prevents sensor cable 12 from moving and in turn prevents sensor arm 6 from rotating. Thus, under loaded conditions the internal porting of empty/load sensor valve device 10 will not change and the internal porting of proportional valve 50 also will not change. In effect this insures maximum available brake cylinder pressure for a loaded car and brake cylinder pressure, related to the amount of brake pipe reduction, flows uninterrupted to the brake cylinder.

In FIG. 1 it can be seen that there is a small gap 46 between terminal member 42 of sensor cable 12 and sprung truck member 40 to allow for normal bounce of such railway vehicle without causing excess wear on sensor cable 12.

For a brake application in the case of a car that is not loaded or if the truck spring deflection is less than 20% of its total travel, the degree of movement of sensor cable 6 is sufficient to read the car as "empty" and not as "full". In this condition, flow of air through brake cylinder line 22 from freight brake control valve 20 through proportional valve 50 occurs as on a loaded car condition until the 13–15 psi is reached on the left side of sensor valve piston 2. As the pressure increases, sensor valve piston 2 will force push rod 5 to extend which causes sensor arm 6 to rotate around pivot 8 and pulls sensor cable 12 back toward unsprung truck member (side frame) 44. This is possible since the sprung truck member 40 did not move at all or did not move a sufficient distance from unsprung truck member 44 to prevent the cable from moving in response to movement of sensor arm 6. In this "empty" condition, sensor spring 4 and sensor valve piston 2 move far enough to enable sensor valve spool 18 to align passages 14 and 16 with air lines 34 and 38.

The alignment of passages 14 and 16 will connect air pressure from brake cylinder line 22 of the freight brake control valve 20, through air line 36, through passages 14 and 16 to air line 34 which is connected to equalizing volume reservoir 35 and through port 27 to cavity A on top of diaphragm 32 in load proportional valve 50. The effective area of diaphragm 32 in relation to the effective area of balance piston 26 of load proportional valve 50 is such that in load proportional valve 50, diaphragm 32 will move downward on balance piston 26 forcing check valve 45 to move causing valve element 46 to close on annular valve seat 28 and close off the supply of air to brake cylinder 38 when the brake cylinder pressure reaches a percentage of that in brake cylinder line 22 of the freight brake control valve 20. For an empty car condition, then, brake cylinder pressure will be approximately 50% or 60% of that applied to a loaded car for any brake pipe reduction over a minimum service application.

In the presently preferred embodiment of the invention, the lever arrangement of sensor arm 6, pivot 8 and cable 12 provides for full travel with only a 1" spring travel of the sprung truck member 40. Thus, it is possible for such empty/load valve device to operate in railroad cars which possess only a minimal displacement. The reversed sensor arm and cable arrangement of the present invention, which is evident in FIG. 1, also makes possible the use of a reduced diameter cable because the "pull" friction in the empty/load sensor valve device 10 is less than the "push" friction of earlier sensor arm and cable arrangements.

Also in the present invention, the air line "loop" in air line 34, between equalizing volume reservoir 35 and empty/load sensor valve device 10, is similar in function to indicators in some previous empty/load braking systems wherein it prevents a sudden brake cylinder pressure drop when empty/load sensor valve 10 opens.

After a brake application the brake cylinder will exhaust. During this release, air is vented from brake cylinder line 22 of freight brake control valve 20. With pressure relieved from cavity B on top of check valve 45 of load proportional valve 50, pressure in brake cylinder line 22 will move check valve 45 up which moves valve element 46 off valve seat 28 and enable brake cylinder air in air line 36 to flow through brake cylinder line 22 to exhaust. Pressure will also be relieved from sensor valve piston 2 in empty/load sensor valve 10. When this pressure depletes to less than the preload of sensor spring 4 (13–15 psi), sensor valve piston 2 and spool valve 18 will move back to their normal positions under the urging of sensor spring 4 and again air line 34 will be connected through passages 14 and 16 to vent.

A "lost motion" feature designed into the piston and sensor linkage compensates for normal body roll that would tend to create a false reading by sensor cable 10. If the car is fully loaded (maximum spring deflection) the roll would have to be severe enough to cause the truck springs to move to more than 80% of their full deflection to create a false empty car condition. This means that when the car is loaded the roll would have to be severe enough to cause sprung truck member 40 to move to less than 20% of the possible travel from unsprung truck member 44 in order to create a false empty car condition.

Figure 5:
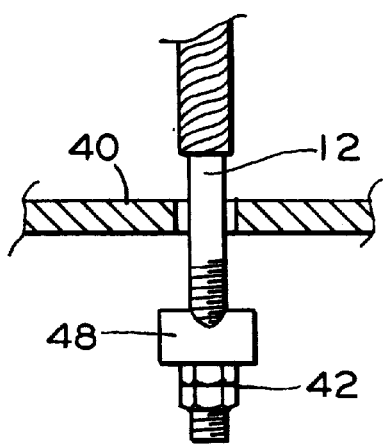
FIG. 5 is a side elevation view of the terminal member of the sensor cable as employed in the empty/load brake control system of FIG. 1.
Figure 4:
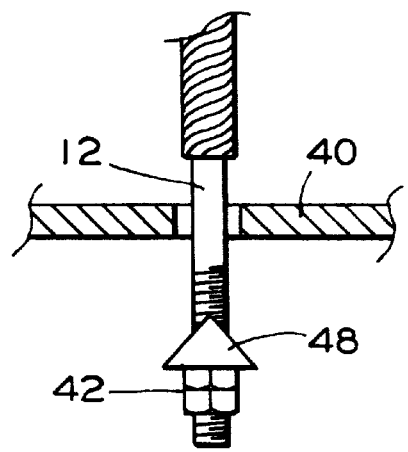
FIG. 4 is a front elevation view of the terminal member of the sensor cable as employed in the empty/load brake control system of FIG. 1.

Reference is now made, more particularly, to FIG. 4 and FIG. 5. Illustrated therein are front and side enlarged views of the terminal member 42 of sensor cable 12. It can be seen in FIG. 4 that the top portion 48 of terminal member 42 that attaches to sensor cable 12 is tapered. In a preferred embodiment of the present invention the tapered top portion 48 is designed to cut through any mud or ice which may collect between sprung truck member 40 and the terminal member 42 of such sensor cable 12. Since the empty/load braking systems are external and exposed to all weather conditions, a buildup of either mud or snow can impair the smooth movement of sensor cable 12 when sensor arm 6 is being urged by push rod 5 to pull sensor cable 12 in order to indicate an empty condition. If the cable 12 is prevented from moving, as would be the case if a buildup of snow or mud restricted the movement of such terminal member 42, the empty/load sensor valve would not sense that the car was "empty" and brake cylinder pressure would be applied as if it were a loaded car.

While a presently preferred embodiment of the present invention has been described in detail above, it should be understood that various other adaptations and/or modifications of the invention can be made by those persons who are particularly skilled in the relative art of railway braking systems and more particularly empty/load sensor valves without departing from either the spirit of the invention or the scope of the appended claims.

We claim:

1. An empty/load brake control system having at least a first portion mountable on a sprung member and a second portion on an unsprung member of a railway car and operably disposed between a railway car brake control valve device and a brake cylinder device for adjusting pressure being exerted on such brake cylinder during a brake application according to a loaded condition of such railway car, said empty/load brake control system comprising:

(a) an empty/load sensor valve device with an inlet passage connected to said brake control valve device and an outlet passage connected to said brake cylinder device;

(b) a load sensing means connected to said empty/load sensor valve and having a first portion disposed on such sprung member and a second portion disposed on such unsprung member for measuring a distance therebetween to provide an empty setting and a load setting of said empty/load sensor valve device depending upon said distance being one of greater and less than a predetermined distance corresponding to a changeover point between said empty and said load settings, said load sensing means including;

(i) a sensor arm pivotably connected to a portion of said empty/load sensor valve device and having a first end thereof connected to a sensor piston member disposed for reciprocal movement in said empty/load sensor valve device, (ii) a terminal member disposed in contact with such sprung member so that any downward movement of such sprung member forces said terminal member in a similar downward direction, (iii) a sensor cable connected on a first end thereof to a second end of said sensor arm and on a second end thereof to said terminal member, said sensor cable moving in a direction which urges said sensor arm away from a retracted position when said terminal member moves in a downward direction in response to downward movement of such sprung member, said sensor piston being subject to fluid under pressure effective at said inlet passage of said empty/load sensor valve device during such brake application for urging movement of said sensor arm to rotate and retract said sensor cable, and (iv) a sensor spring caged in a cavity in said empty/load sensor valve device and disposed in contact with a wall of said empty/load sensor valve device and with said sensor piston for resisting movement of said sensor piston by a predetermined preload of said sensor spring;

(c) a load proportional valve means disposed between said empty/load sensor valve device and said brake control valve, having a proportioning mode of operation and a non-proportioning mode of operation, said load proportional valve means including:

(i) a fixed valve seat disposed between inlet and outlet passages of said load proportional valve, (ii) a balance piston having equal opposing pressure areas, a first one of said opposing pressure areas being subject to fluid under pressure effective at said inlet passage, and (iii) a release check valve including a valve member connected to said balance piston which engages said fixed valve seat; and (d) an equalizing reservoir disposed between said load proportional valve means and said empty/load sensor valve device for providing necessary volume to maintain a satisfactory relationship for various pipe brake reductions, said empty/load sensor valve device is fluidly connected to said balance piston of said load proportional valve for supplying fluid under pressure effective at said inlet passage to a second one of said opposing pressure areas of said balance piston when said empty/load sensor valve device is in said empty setting to establish a differential force across said balance piston in a direction of engagement of said valve member of said check valve with said fixed valve seat, thereby providing said proportioning mode of operation and not supplying fluid under pressure to said second one of said opposing pressure areas of said balance piston when said empty/load sensor valve device is in said load setting thereby providing said non-proportioning mode of operation.

2. An empty/load brake control system, according to claim 1, wherein downward movement of such sprung truck member for a predetermined distance will cause full travel of said sensor arm.

3. An empty/load brake control system, according to claim 2, wherein said predetermined distance is one inch.

4. An empty/load brake control system, according to claim 1, wherein said pivotably connected sensor arm being pulled by said sensor cable when such sprung truck member moves in a downward direction provides a system in which less friction is produced.

5. An empty/load brake control system, according to claim 4, wherein a reduced diameter cable is used for said sensor cable since less friction is produced by said sensor cable and said sensor arm arrangement.

6. An empty/load brake control system, according to claim 1, wherein said terminal member further includes a tapered top portion.

7. An empty/load brake control system, according to claim 6, wherein said tapered top portion of said terminal member significantly reduces the possibility of any undesirable build up of snow and mud between said terminal member and such sprung truck member.

* * * * *